United States Patent
Yue et al.

(10) Patent No.: US 12,496,877 B2
(45) Date of Patent: Dec. 16, 2025

(54) PRESSURE RELIEF VALVE

(71) Applicant: Illinois Tool Works Inc., Glenview, IL (US)

(72) Inventors: Guofeng Yue, Ningbo (CN); Qihong Teng, Ningbo (CN); Kaida Chen, Ningbo (CN)

(73) Assignee: Illinois Tool Works Inc., Glenview, IL (US)

( * ) Notice: Subject to any disclaimer, the term of this patent is extended or adjusted under 35 U.S.C. 154(b) by 426 days.

(21) Appl. No.: 18/161,606

(22) Filed: Jan. 30, 2023

(65) Prior Publication Data

US 2023/0241944 A1  Aug. 3, 2023

(30) Foreign Application Priority Data

Jan. 29, 2022 (CN) .......................... 202210112329.1
Sep. 20, 2022 (CN) .......................... 202211141592.X

(51) Int. Cl.
*B60H 1/24* (2006.01)
*B60H 1/00* (2006.01)

(52) U.S. Cl.
CPC ......... *B60H 1/249* (2013.01); *B60H 1/00764* (2013.01); *B60H 1/00771* (2013.01); *B60H 1/008* (2013.01)

(58) Field of Classification Search
CPC ........ B60H 1/248; B60H 1/249; B60H 1/008; B60H 1/00764; B60H 1/00771
See application file for complete search history.

(56) References Cited

U.S. PATENT DOCUMENTS

| | | | |
|---|---|---|---|
| 2009/0088062 A1* | 4/2009 | Major ................. | H01M 10/625 454/70 |
| 2010/0112927 A1* | 5/2010 | Marga ..................... | B08B 15/00 49/70 |

(Continued)

*Primary Examiner* — Ko-Wei Lin
(74) *Attorney, Agent, or Firm* — McAndrews, Held & Malloy, Ltd.

(57) ABSTRACT

The present disclosure provides a pressure relief valve configured to adjust a pressure of a vehicle cabin. The pressure relief valve includes: a housing, a passage opening cover, and an implementing mechanism. The housing is provided with a passage therein, the passage is configured to be capable of bringing the vehicle cabin into fluid communication with an outside atmosphere, and the passage has a passage opening. The passage opening cover is configured to be movable between an open position and a closed position, the passage opening is open when the passage opening cover is in the open position, and the passage opening is closed when the passage opening cover is in the closed position. The implementing mechanism is configured to drive the passage opening cover such that the passage opening cover is movable between the open position and the closed position. According to the present disclosure, signal information of pressure in a vehicle cabin, wading and dust density is obtained, and a traditional rotary opening mode of the pressure relief valve is changed into a linear opening mode through motor driving, such that electrification of the pressure relief valve is achieved, noise from the outside of the vehicle is reduced, and waterproof and dustproof performances of the pressure relief valve are improved.

19 Claims, 12 Drawing Sheets

(56) References Cited

U.S. PATENT DOCUMENTS

| | | | | |
|---|---|---|---|---|
| 2012/0003907 A1* | 1/2012 | Carlson | ............. | B60H 1/00835 |
| | | | | 454/70 |
| 2014/0273786 A1* | 9/2014 | Wade | ................. | B60H 1/00735 |
| | | | | 454/75 |
| 2017/0158021 A1* | 6/2017 | Iacovoni | ............ | B60H 1/00835 |
| 2018/0288932 A1* | 10/2018 | Winkel | .................. | B60H 1/248 |
| 2019/0381863 A1* | 12/2019 | Currle | ................ | B60H 1/00849 |
| 2020/0262268 A1* | 8/2020 | Williams | ........... | B60H 1/00828 |
| 2023/0241944 A1* | 8/2023 | Yue | ........................ | B60H 1/008 |
| | | | | 454/340 |

\* cited by examiner

B - B

A-A

A-A

PRESSURE RELIEF VALVE

RELATED APPLICATIONS

The present application claims the benefit of Chinese Patent Application Serial No. 202210112329.1, filed Jan. 29, 2022, and the benefit of Chinese Patent Application Serial No. 202211141592.X, filed Sep. 20, 2022. The entireties of Chinese Patent Application Serial No. 202210112329.1 and Chinese Patent Application Serial No. 202211141592.X are expressly incorporated herein by reference.

TECHNICAL FIELD

The present disclosure relates to the technical field of vehicle parts, and in particular, to a pressure relief valve for releasing air pressure inside a vehicle.

BACKGROUND

A vehicle cabin is a relatively closed space. In order to control pressure inside the vehicle cabin, it is necessary to equip a vehicle with an air vent and a pressure relief valve. The pressure relief valve can open or close the air vent as required, so as to balance the pressure inside the vehicle.

SUMMARY OF THE EMBODIMENTS

With the rising requirements for vehicle quality, consumers have further requirements regarding noise, vibration and harshness (NVH), waterproofing (including vehicle wading performance), and reduced dust ingress for vehicles, especially for electric vehicles. The inventors have realized that as a part of a vehicle ventilation system, a pressure relief valve for releasing air pressure inside a vehicle can not only maintain air pressure balance between inside and outside of the vehicle, but also play an important role in reducing the ingress of dust, water and noise from the outside of the vehicle. The pressure relief valve needs to consider and satisfy two requirements in terms of pressure relief and sealing. If the pressure relief valve is easy to open in response to a pressure difference between inside and outside of a vehicle cabin, the tightness of the pressure relief valve may be poor, which may cause the easy ingress of rain, dust and noise from the outside of the vehicle into the vehicle cabin, and reduce the ride comfort and safety (electric vehicles are prone to leakage of electricity when exposed to water).

At present, most of the pressure relief valves for vehicle cabins use flexible rubber sheets as sealing devices. When the air pressure inside the vehicle cabin exceeds the air pressure outside the vehicle cabin by a certain value, opening and closing of such a rubber sheet depend on the weights of the rubber sheet, rotation of the rubber sheet and bending of the rubber sheet. An existing pressure relief valve for a vehicle cabin includes a flexible rubber sheet and a plastic skeleton frame. The flexible rubber sheet is pivotally connected to the skeleton frame, and a center of the skeleton frame is provided with an opening. When the air pressure inside the vehicle cabin exceeds the air pressure outside the vehicle cabin by a certain value, the rubber sheet opens outwardly due to the air pressure difference, such that the air pressure inside the vehicle cabin is released from the central opening of the skeleton frame. When the pressures inside and outside the vehicle cabin are rebalanced, the rubber sheet can be closed on the skeleton frame under the gravity of the rubber sheet so as to cover the central opening of the skeleton frame, such that the ingress of gas, rain, dust and noise from the outside of the vehicle into the vehicle cabin can be reduced.

However, such a pressure relief valve has the following defects: First, the flexible rubber sheet of the pressure relief valve is easy to open under the action of pressure or wind force during a vehicle driving, which will cause the ingress of rain, dust and noise from the outside of the vehicle into the vehicle cabin, and thus cause the pollution of parts inside the vehicle cabin by the rain and dust, and cause the reduced ride comfort of passengers due to the noise. Second, when the flexible rubber sheet is opened and closed, the rubber sheet will vibrate or flap the skeleton frame, resulting in unnecessary noise. Especially when the vehicle is running in a state in which, for example, the rubber sheet resonates with the whole vehicle or the pressures inside and outside the vehicle change continuously, the flexible rubber sheet will continuously vibrate or flap to generate noise. Third, the pressure relief valve is usually passively opened or closed in response to the pressure difference between the inside and outside of the vehicle cabin. As such, when the vehicle is in a harsh environment (such as stormy weather) or passing a water-gathered road, the rubber sheet cannot be closed by itself, causing the ingress of pollutants such as rain and dust from the outside of the vehicle into the vehicle cabin.

Therefore, according to a first aspect of the present disclosure, there is provided a pressure relief valve configured to adjust a pressure of a vehicle cabin. The pressure relief valve includes a housing, a passage opening cover, and an implementing mechanism (or actuating mechanism). The housing is provided with a passage therein, the passage is configured to be capable of bringing the vehicle cabin into fluid communication with an outside atmosphere, and the passage has a passage opening. The passage opening cover is configured to be movable between an open position and a closed position, the passage opening is open when the passage opening cover is in the open position, and the passage opening is closed when the passage opening cover is in the closed position. The implementing mechanism is configured to drive the passage opening cover such that the passage opening cover moves between the open position and the closed position.

According to the first aspect of the present disclosure, the implementing mechanism includes a driver and a movable rod.

According to the first aspect of the present disclosure, the pressure relief valve further includes: a controller configured to control the movement of the movable rod.

According to the first aspect of the present disclosure, the pressure relief valve further includes a sealing component arranged at an edge of the passage opening cover. The sealing component is configured such that the sealing component sealingly fits with the passage opening when the passage opening cover is in the closed position.

According to the first aspect of the present disclosure, the implementing mechanism includes a motor for driving the passage opening cover to move between the open position and the closed position.

According to the first aspect of the present disclosure, the pressure relief valve further includes: a data collection module configured to collect parameters of a vehicle body. The controller is configured to control the movement of the movable rod according to the parameters of the vehicle body, so as to control the movement of the passage opening cover between the open position and the closed position.

According to the first aspect of the present disclosure, the controller is configured to control a movement distance of the movable rod according to the parameters of the vehicle body, so as to control an opening and closing or an opening degree of the pressure relief valve.

According to the first aspect of the present disclosure, the data collection module further includes: a liquid level sensor for collecting a liquid level parameter. The controller controls the movement of the movable rod according to the liquid level parameter, so as to control the movement of the passage opening cover between the open position and the closed position.

According to the first aspect of the present disclosure, the data collection module further includes: a dust density sensor for collecting a dust density parameter. The controller controls the movement of the movable rod according to the dust density parameter, so as to control the movement of the passage opening cover between the open position and the closed position.

According to the first aspect of the present disclosure, the data collection module further includes: an airbag state sensor for collecting an airbag state parameter. The controller controls the movement of the movable rod according to the airbag state parameter, so as to control the movement of the passage opening cover between the open position and the closed position.

According to the first aspect of the present disclosure, the data collection module further includes: a door opening and closing sensor for collecting a door opening and closing parameter. The controller controls the movement of the movable rod according to the door opening and closing parameter, so as to control the movement of the passage opening cover between the open position and the closed position.

According to the first aspect of the present disclosure, the data collection module further includes: an air conditioner state sensor for collecting an air conditioner state parameter. The controller controls the movement of the movable rod according to the air conditioner state parameter, so as to control the movement of the passage opening cover between the open position and the closed position, or to control the opening degree of the passage opening cover.

According to the first aspect of the present disclosure, the data collection module further includes: a window state sensor for collecting a window state parameter. The controller controls the movement of the movable rod according to the window state parameter, so as to control the movement of the passage opening cover between the open position and the closed position, or to control the opening degree of the passage opening cover.

According to the first aspect of the present disclosure, the data collection module further includes: a pressure sensor for collecting a pressure parameter. The controller controls the movement of the movable rod according to the pressure parameter, so as to control the movement of the passage opening cover between the open position and the closed position, or to control the opening degree of the passage opening cover.

According to the first aspect of the present disclosure, the data collection module further includes: a user control terminal for collecting a user input parameter. The controller controls the movement of the movable rod according to the user input parameter, so as to control the movement of the passage opening cover between the open position and the closed position, or to control the opening degree of the passage opening cover.

According to the first aspect of the present disclosure, the controller is in a communication connection with the data collection module via a first communication channel; and the controller is in a communication connection with the implementing mechanism via a second communication channel, wherein a local interconnect network (LIN) connection or a controller area network (CAN) connection is capable of being carried out in the first communication channel, and a LIN connection or a CAN connection is capable of being carried out in the second communication channel.

According to the first aspect of the present disclosure, the pressure relief valve further includes a housing sealing strip configured to sealingly fix the housing to a metal plate of a vehicle.

According to the first aspect of the present disclosure, the passage opening cover is moved in a straight line to any position between the open position and the closed position.

According to a second aspect of the present disclosure, there is provided a vehicle having the pressure relief valve according to the first aspect of the present disclosure.

According to a third aspect of the present disclosure, there is provided a method for controlling a pressure relief valve for a vehicle. The pressure relief valve includes a housing, a passage opening cover, and an implementing mechanism. The housing is provided with a passage therein, and the passage has a passage opening. The method includes the following steps: setting thresholds of a vehicle operation environment; collecting parameters of the vehicle operation environment; comparing and analyzing the parameters of the vehicle operation environment; and controlling the implementing mechanism according to a comparison result, so as to control an opening and closing or an opening degree of the passage opening cover.

According to the third aspect of the present disclosure, the thresholds of the vehicle operation environment include one or more of a liquid level threshold, a dust density threshold, and a pressure difference threshold; and the parameters of the vehicle operation environment include one or more of a liquid level parameter, a dust density parameter, an airbag state parameter, a door opening and closing parameter, an air conditioner state parameter, a window state parameter, a pressure parameter, and a user input parameter.

Some of the additional aspects and advantages of the present application will be set forth in the following description, and some will become apparent from the following description, or be learned by practice of the present application.

DETAILED DESCRIPTION OF THE EMBODIMENTS

Figure 1:
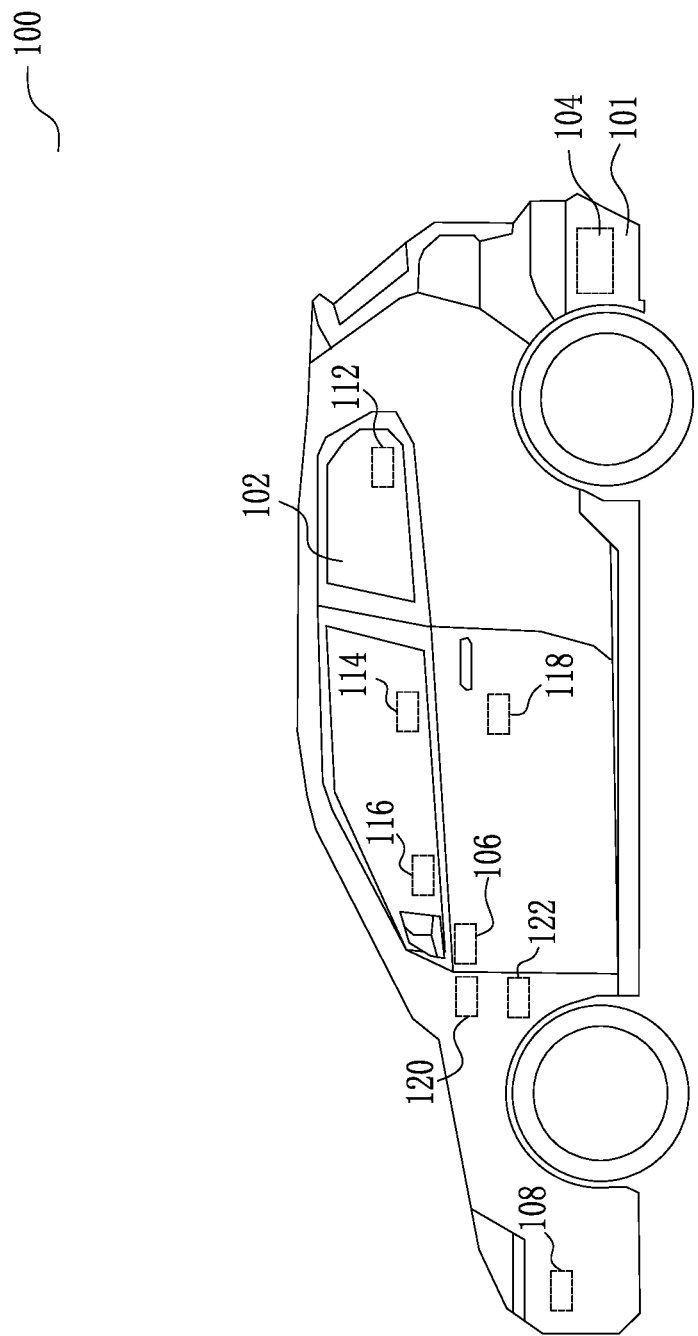
FIG. 1 is a schematic view of a vehicle 100 having a pressure relief valve 104 of the present disclosure.

Various specific embodiments of the present disclosure will be described below with reference to the accompanying drawings which constitute part of the present disclosure, but would not limit the present disclosure. It should be understood that although the terms such as "front", "rear", "upper", "lower", "left", and "right" indicating directions are used in the present disclosure to describe orientations of various illustrative structural parts and elements in the present disclosure, the terms used herein are merely used for ease of description and are determined based on the illustrative orientation shown in the accompanying drawings. Since the embodiments disclosed in the present disclosure can be arranged in different directions, the terms indicating directions are merely illustrative and should not be considered as limitations. In addition, the terms "first", "second", etc. used in the present disclosure are merely used to distinguish different objects, instead of indicating that there is any particular sequential relationship between these objects. The term "comprise/include" and derivatives thereof mean inclusion without limitation. Unless otherwise specified and limited, the terms "mount" and "connect" should be understood broadly. For example, they may be mechanical or electrical connection, internal communication between two elements, or direct connection or indirect connection via an intermediate medium. For those of ordinary skills in the art, the specific meanings of the above terms can be understood according to specific cases. If possible, the same or similar reference numerals used in the present disclosure refer to the same components.

FIG. 1 is a schematic view of a vehicle 100 having a pressure relief valve 104 of the present disclosure. As shown in FIG. 1, the vehicle 100 has a vehicle cabin 102 and a pressure relief valve 104 for balancing air pressures inside and outside the vehicle cabin 102. The pressure relief valve 104 is an invisible part of the vehicle, and is mounted on a metal plate 101 at the bottom of a rear side of the vehicle 100, for example, on a metal plate on an inner side of a rear bumper of the vehicle. The vehicle 100 is further provided with a number of sensors for collecting parameters of the vehicle, such as a liquid level sensor 106 configured to collect liquid level information (wading information) of the vehicle, a dust density sensor 108 configured to collect dust density information of an environment where the vehicle is located, a pressure sensor 112 configured to collect an air pressure parameter inside the vehicle cabin 102, a window state sensor 114 configured to collect information of a window open state, a door opening and closing sensor 118 configured to collect information of a door opening and closing state, an air conditioner state sensor 120 configured to collect information of an air conditioner turn-on state, and an airbag state sensor 122 configured to collect an airbag state parameter. For an electric pressure relief valve 104, a controller 601 arranged inside or outside the pressure relief valve 104 (with reference to the description of FIG. 6) can control opening and closing, or an opening degree of the pressure relief valve 104 according to the parameters or signals collected by the above sensors. In addition, the vehicle 100 further has a user control terminal 116 configured to collect various control information input by a user, and the user may directly control the opening and closing, or the opening degree of the electric pressure relief valve 104 by means of the user control terminal 116. For example, when encountering rain and snow, the user may close the pressure relief valve 104 with pressing one button.

Figure 2A:
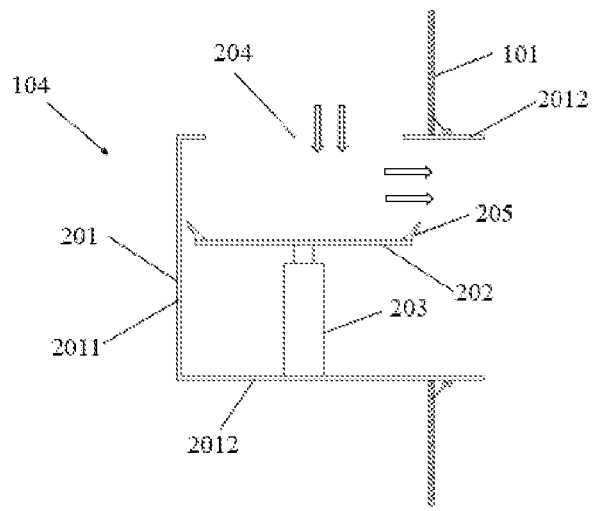
FIG. 2A is a schematic view of the pressure relief valve 104 of the present disclosure in an open state.
Figure 2B:
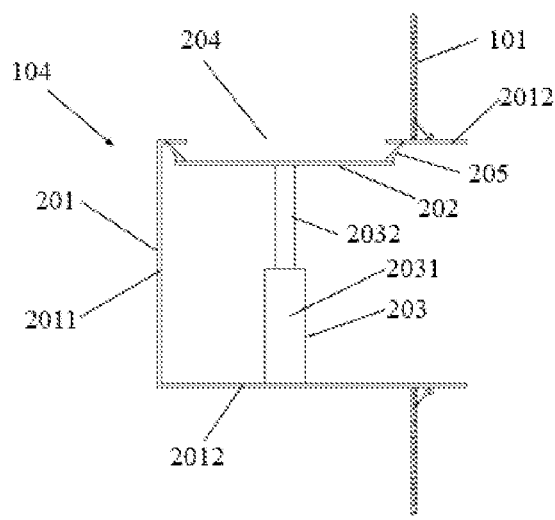
FIG. 2B is a schematic view of the pressure relief valve 104 of the present disclosure in a closed state.

FIGS. 2A and 2B are views showing the working principle of the pressure relief valve 104 of the present disclosure. FIG. 2A is a schematic view of the pressure relief valve 104 of the present disclosure in an open state. FIG. 2B is a schematic view of the pressure relief valve 104 of the present disclosure in a closed state. In the open state, the pressure relief valve 104 releases pressure in the vehicle cabin. In the closed state, a cover 202 of the pressure relief valve 104 covers an opening 204.

As shown in FIGS. 2A and 2B, the pressure relief valve 104 is mounted on the metal plate 101 and protrudes toward the inside of the vehicle 100 (the left side in FIGS. 2A and 2B). The pressure relief valve 104 includes a housing 201, the cover 202 and a driving mechanism 203. As shown in FIG. 2A, the housing 201 has a box-like structure. The housing 201 includes a bottom face 2011 protruding toward the inside of the vehicle and four side faces 2012 connected to the bottom face 2011. At least one of the side faces 2012 of the housing 201 is provided with an opening 204. In one embodiment of the present disclosure, the opening 204 is provided on an upper side face of the housing 201. The cover 202 is driven by the driving mechanism 203 to move, between an open position and a closed position, close to or away from the opening 204. As shown in FIG. 2A, the cover 202 is configured such that in the open position, it moves away from the opening 204, so as to form an air passage along which air in the vehicle cabin can flow out of the vehicle cabin (in an arrow direction shown in FIG. 2A) so as to release air pressure of the vehicle cabin. As shown in FIG. 2B, the cover 202 is configured such that in the closed position, the cover 202 covers the opening 204 so as to close the air passage.

Further, the pressure relief valve 104 further includes a sealing component 205. The sealing component 205 is arranged at an edge of the cover 202. Preferably, the sealing component 205 is made of a flexible material. When the cover 202 is driven to the closed position by the driving mechanism 203, the sealing component 205 engages with the side face 2012 (the upper side face) of the housing 201.

Further, the driving mechanism 203 includes a driver 2031 and a movable rod 2032. The movable rod 2032 is connected to the cover 202, and the driver 2031 may be located on a side face 2012 of the housing 201 opposite to the side face provided with the opening 204. The movable rod 2032 may be driven by the driver 2031 to move linearly. In one specific embodiment of the present disclosure, the driving mechanism 203 includes a motor.

Although in the schematic views shown in FIGS. 2A and 2B, the opening 204 of the pressure relief valve 104 is provided on the upper side face or another side face 2012 of the housing 201, and the cover 202 is driven by the driving mechanism 203 to move linearly in a vertical direction, for those of ordinary skills in the art, the opening 204 of the pressure relief valve 104 may also be provided on the bottom face 2011, and the cover 202 may be driven by the driving mechanism 203 to move linearly in a left-right (horizontal) direction.

Figure 3A:
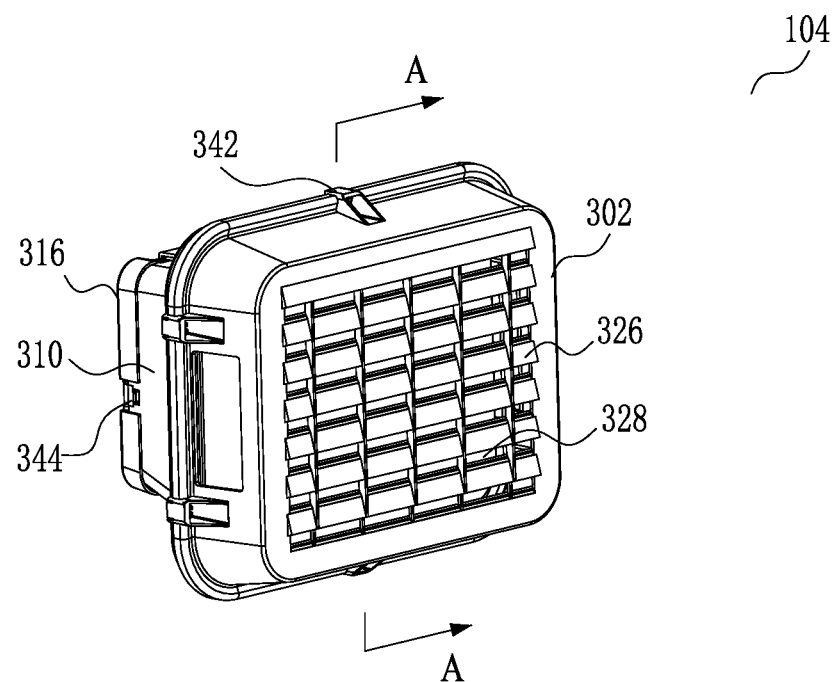
FIG. 3A is a perspective view of the pressure relief valve 104 of the present disclosure.
Figure 3B:
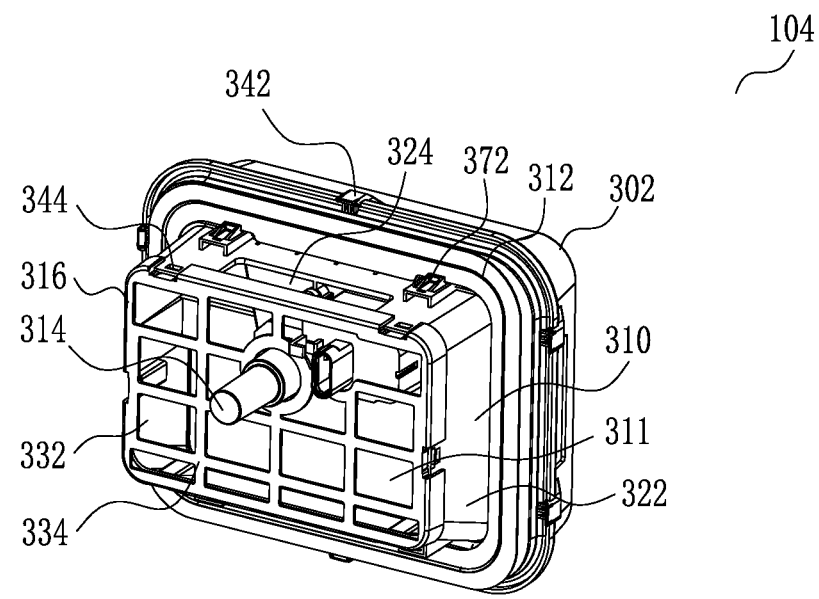
FIG. 3B is another perspective view of the pressure relief valve 104 of the present disclosure.
Figure 3C:
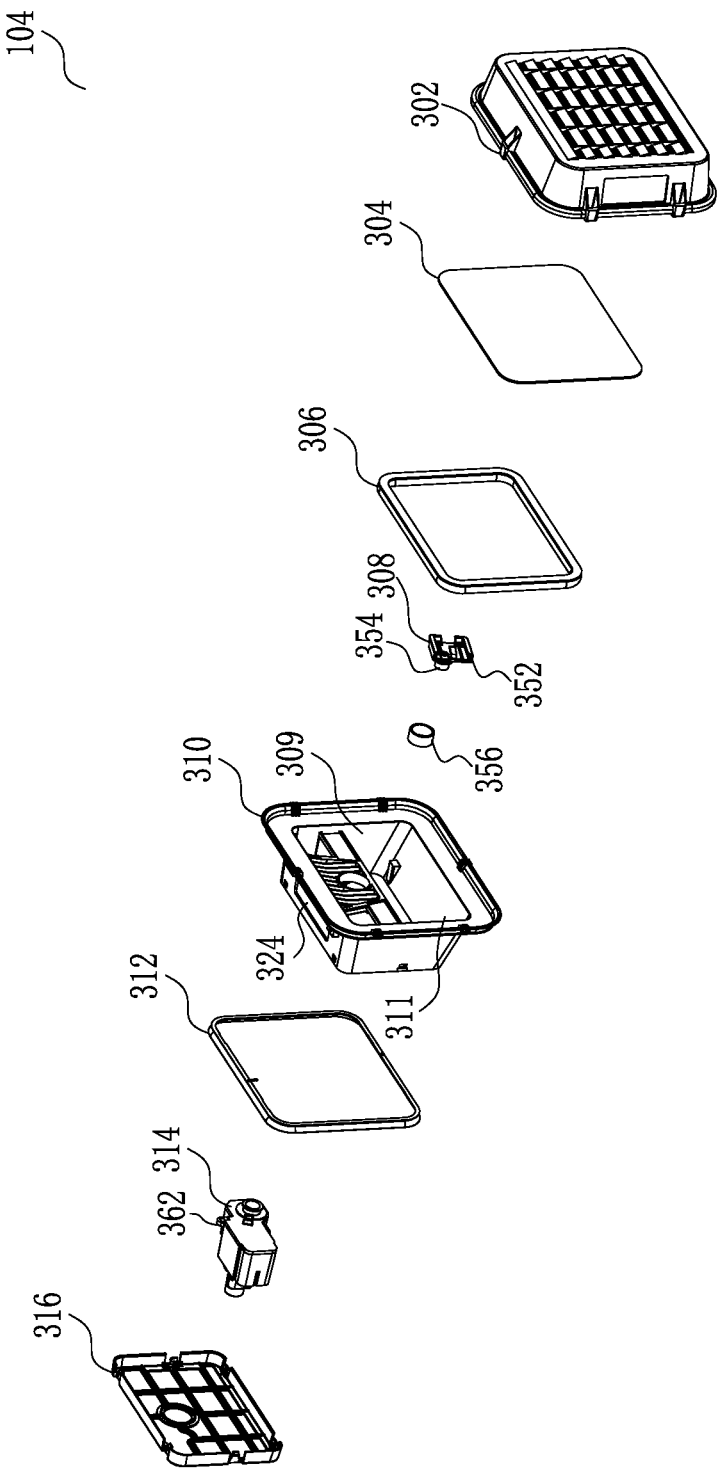
FIG. 3C is an exploded view of the pressure relief valve 104 of the present disclosure.

FIGS. 3A-3C are detailed structures of the pressure relief valve 104 shown in FIGS. 2A and 2B, and show an embodiment in which a passage opening cover 304 (corresponding to the cover 202 shown in FIGS. 2A and 2B) of the pressure relief valve 104 is driven by an implementing mechanism (or actuating mechanism) 314 to move linearly in the horizontal direction. FIG. 3A is a perspective view of the pressure relief valve 104 of the present disclosure. FIG. 3B is another perspective view of the pressure relief valve 104 of the present disclosure. FIG. 3C is an exploded view of the pressure relief valve 104 of the present disclosure and shows more components inside the pressure relief valve 104.

As shown in FIGS. 3A and 3B, the pressure relief valve 104 includes a housing 310, a front shroud 302, a rear shroud 316, and the implementing mechanism 314.

The housing 310 is integrally formed through injection molding, and has four side walls 322 and a passage 311 extending through the housing 310 in a front-rear direction, such that gas in the vehicle cabin 102 can be in fluid communication with an outside atmosphere. The passage 311 has a passage opening 309 (with reference to FIG. 3C) directing towards the outside of the vehicle cabin 102, and an upper side wall of the four side walls 322 has an opening 324 with which a ventilation area from the inside of the vehicle to the pressure relief valve 104 is further increased.

The front shroud 302 has a number of baffles 326 and a number of ventilation holes 328. The baffles 326 can at least prevent part of rain and dust from entering the pressure relief valve 104. The ventilation holes 328 bring the front and the rear sides of the front shroud 302 into fluid communication with each other, such that when the pressure relief valve 104 is in the open state, the gas inside the vehicle cabin 102 is allowed to pass through the front shroud 302 to reach the outside of the vehicle cabin 102.

The rear shroud 316 has a grid structure, which has a number of grid holes 332 and grid bars 334. The grid holes 332 bring the front and the rear sides of the rear shroud 316 into fluid communication with each other, such that the gas inside the vehicle cabin 102 is allowed to enter the pressure relief valve 104. The grid bars 334 can further prevent foreign objects (such as small animals) outside the vehicle cabin 102 from entering the vehicle cabin 102.

The front shroud 302 and the rear shroud 316 are fixed to the housing 310 by means of a number of first snap fittings 342 and a number of second snap fittings 344 respectively. For those of ordinary skills in the art, a way of connecting the front shroud 302 and the rear shroud 316 to the housing 310 is not limited to snap-fit fixing. The front shroud 302 and the rear shroud 316 may also be fixed to the housing 310 in other ways, such as by means of bolt and welding.

As shown in FIG. 3C, the pressure relief valve 104 further includes the passage opening cover 304, a sealing component 306, a connector 308, a housing sealing strip 312, the implementing mechanism 314 and a sealing ring 356.

The passage opening cover 304 may for example be a plate-like structure. The sealing component 306 is made of rubber, such as ethylene propylene diene monomer (EPDM), and is circumferentially fixed to an outer side of the passage opening 309 of the housing 310. When the passage opening cover 304 is in the closed position, the passage opening cover 304 is tightly attached to an outer side of the sealing component 306, so as to sealingly cover the passage opening 309 of the pressure relief valve 104, such that the pressure relief valve 104 is in the closed state, and gas communication between inside and outside of the vehicle cabin 102 is prevented. For those of ordinary skills in the art, the sealing component 306 may also be fixed to an edge of the passage opening cover 304 facing the inside of the vehicle cabin 102. When the pressure relief valve 104 is in the closed state, the passage opening cover 304 is in a sealing fit with the passage opening 309 of the housing 310 by means of the sealing component 306, so as to prevent gas from flowing through the passage opening 309.

Figure 4B:
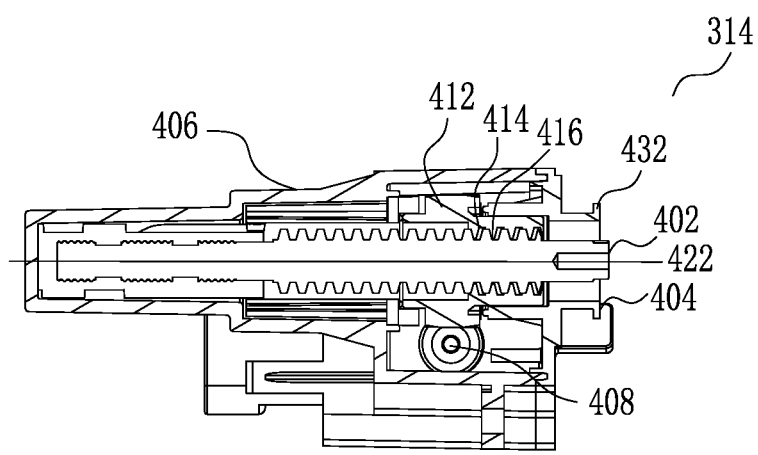
FIG. 4B is a sectional view of the implementing mechanism 314 shown in FIG. 4A along line B-B.
Figure 5A:
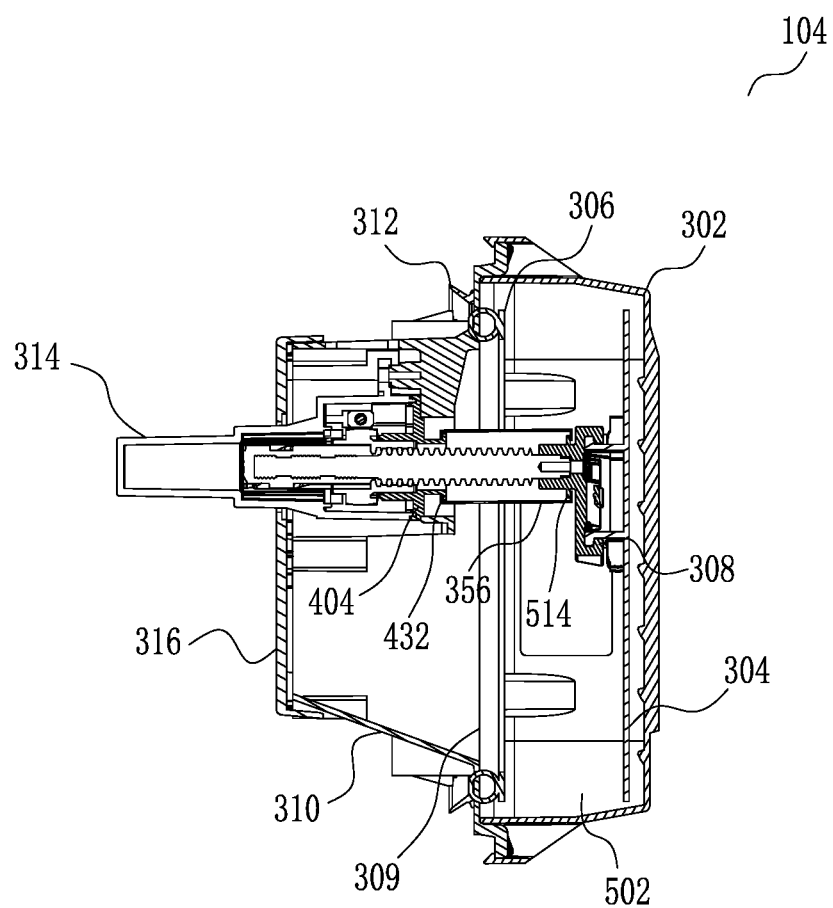
FIG. 5A is a sectional view of the pressure relief valve 104 shown in FIG. 3A along line A-A, showing the pressure relief valve 104 in an open state.
Figure 5B:
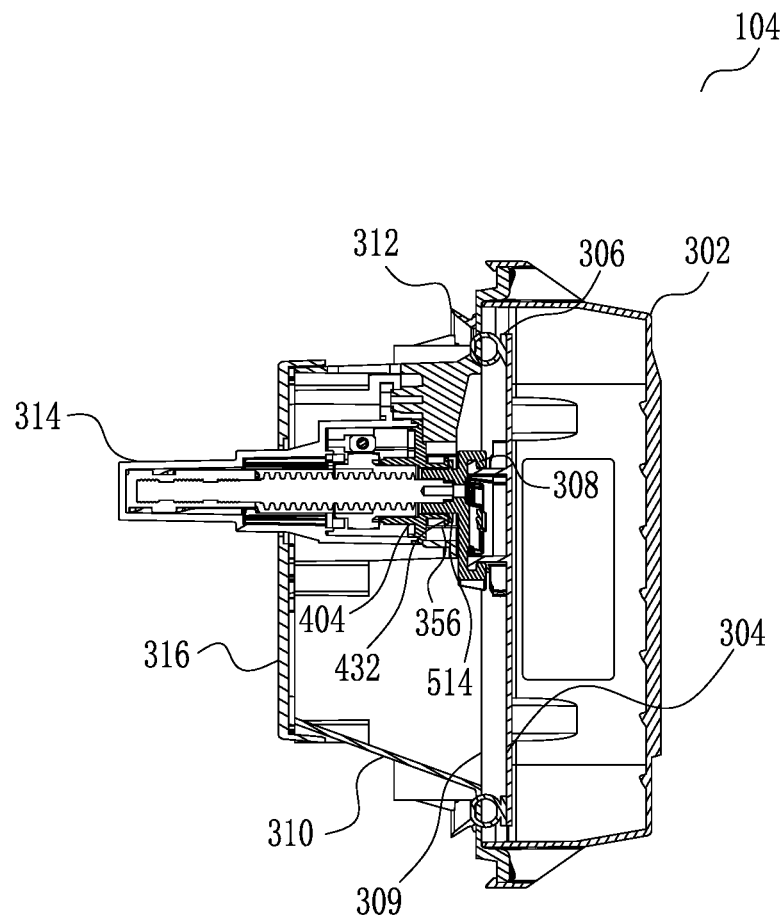
FIG. 5B is a sectional view of the pressure relief valve 104 shown in FIG. 3A along line A-A, showing the pressure relief valve 104 in a closed state.

The connector 308 has a first fixing member 352, a second fixing member 354, and a second connection member 514 configured to be connected to the sealing ring 356 (with reference to FIGS. 5A and 5B). The first fixing member 352 is fixed to the side of the passage opening cover 304 facing the inside of the vehicle cabin 102 (for example, a middle position of an inner side of the passage opening cover 304), and the second fixing member 354 is fixed to a movable rod 402 (with reference to FIG. 4B) of the implementing mechanism 314, such that the passage opening cover 304 is fixedly connected to the implementing mechanism 314 by means of the connector 308, for example, via screws.

The housing sealing strip 312 is fixed to the housing 310 through overmolding, and is configured to sealingly fix the housing 310 to the metal plate 101 of the vehicle 100. Specifically, the housing 310 further has a metal plate fixing member 372 (with reference to FIG. 3B) configured to fix the metal plate 101 of the vehicle 100.

The implementing mechanism 314 includes a driver 408 (with reference to the description of FIG. 4B), a controller 601 (with reference to the description of FIG. 6), and a mounting member 362. The implementing mechanism 314 is configured to drive the passage opening cover 304, such that the passage opening cover 304 can linearly move between the open position (corresponding to the open state of the pressure relief valve 104) and the closed position (corresponding to the closed state of the pressure relief valve 104). In some other embodiments, the controller 601 may also be arranged outside the implementing mechanism 314 and connected to the implementing mechanism 314 by means of a control circuit. The implementing mechanism 314 is fixedly arranged inside the housing 310 by means of the mounting member 362, and for example, may be fixed to the housing 310 through screw connection.

The sealing ring 356 sealingly wraps around a joint between the implementing mechanism 314 and the connector 308. Specifically, with reference to FIG. 5B, a left end of the sealing ring 356 is mounted on a left side of a first connection member 432 of an implementor cover (or actuator cover) 404 of the implementing mechanism 314, and a right end of the sealing ring 356 is mounted on a right side of the second connection member 514 of the connector 308. As shown in FIG. 5A, when the implementing mechanism 314 drives the passage opening cover 304 to move rightwardly, the left end of the sealing ring 356 abuts against the left side of the first connection member 432 of the implementor cover 404, and the right end of the sealing ring 356 abuts against the right side of the second connection member 514 of the connector 308, such that the implementor cover 404 is sealingly connected to the connector 308, and rain and dust are prevented from entering a motor screw rod of the implementing mechanism 314 when the implementing mechanism 314 works.

Figure 4A:
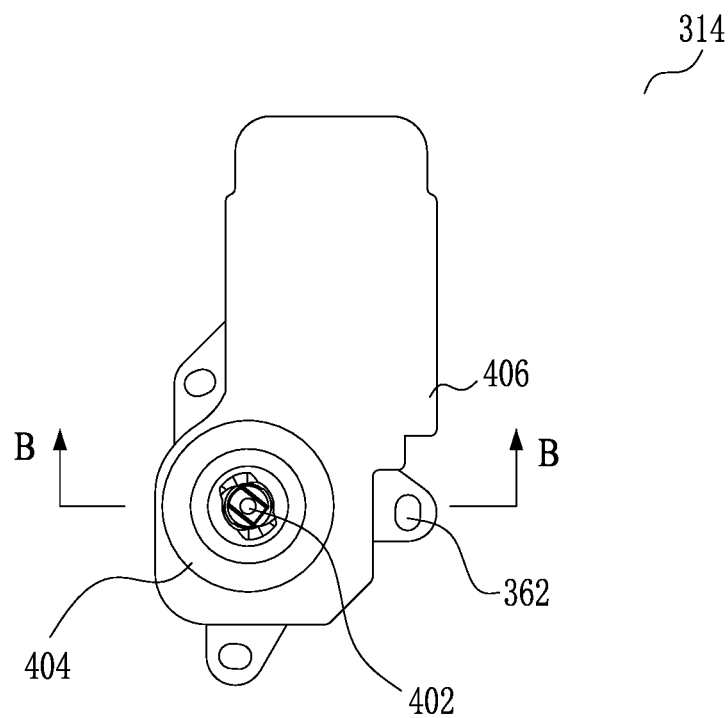
FIG. 4A is a front view of an implementing mechanism 314 in the pressure relief valve 104 of the present disclosure.

FIG. 4A is a front view of the implementing mechanism 314 in the pressure relief valve 104 of the present disclosure.

FIG. 4B is a sectional view of the implementing mechanism 314 shown in FIG. 4A along line B-B and shows more components inside the implementing mechanism 314.

As shown in FIGS. 4A and 4B, the implementing mechanism 314 includes an implementor housing 406, an implementor cover 404, a movable rod 402, a driver 408, a transmission 412, and a first connection member 432 configured to be connected to the sealing ring 356. The transmission 412 has internal teeth 414, and the movable rod 402 has external teeth 416. The internal teeth 414 of the transmission 412 may engage with the external teeth 416 of the movable rod 402. The driver 408 is configured to drive the movable rod 402. The driver 408 may be a motor, and an output shaft of the motor is perpendicular to a rotation axis 422 of the transmission 412. The output shaft of the motor is connected to the transmission 412 by means of a worm gear and a worm shaft, such that rotary motion output by the motor is transmitted to the transmission 412 positioned perpendicular to the motor, and is converted into rotary motion of the transmission 412. The movable rod 402 has coaxial rotation axis with the transmission 412, and is connected to the transmission by means of a lead screw. The rotary motion of the transmission 412 is transmitted to the movable rod 402 through engagement of the internal teeth 414 of the transmission 412 and the external teeth 416 of the movable rod 402, and is converted into the linear motion of the movable rod 402 along the axis 422 (in a left-right direction in FIG. 4B). In this way, the rotary motion output by the motor is converted into the linear motion of the movable rod 402, such that the passage opening cover 304 is driven to linearly move in a straight line to any position between the open position and the closed position.

FIG. 5A is a sectional view of the pressure relief valve 104 shown in FIG. 3A along line A-A, and shows the pressure relief valve 104 in the open state. FIG. 5B is a sectional view of the pressure relief valve 104 shown in FIG. 3A along line A-A, and shows the pressure relief valve 104 in the closed state.

As shown in FIG. 5A, the passage opening cover 304 is driven by the implementing mechanism 314 to move rightwards along a straight line to a position (an open position) away from the passage opening 309, so as to provide an opening 502, such that air inside the vehicle cabin 102 is discharged from the vehicle cabin 102 through the passage opening 309 and the opening 502 of the pressure relief valve 104. In this position, the pressure relief valve 104 is in the open state. The passage opening cover 304 may be driven by the implementing mechanism 314 to move rightwards to different positions, such that openings 502 having different sizes are provided, and different opening degrees of the pressure relief valve 104 in the open state are achieved.

As shown in FIG. 5B, the passage opening cover 304 is driven by the implementing mechanism 314 to move leftwards along a straight line to a position (a closed position) tightly abutting the passage opening 309. The passage opening cover 304 is tightly abutted to the passage opening 309 of the pressure relief valve 104 by means of the sealing component 306, so as to cover the passage opening 309, such that gas inside the vehicle cabin 102 is prevented from being brought into fluid communication with the outside atmosphere. In this position, the pressure relief valve 104 is in the closed state.

Figure 6:
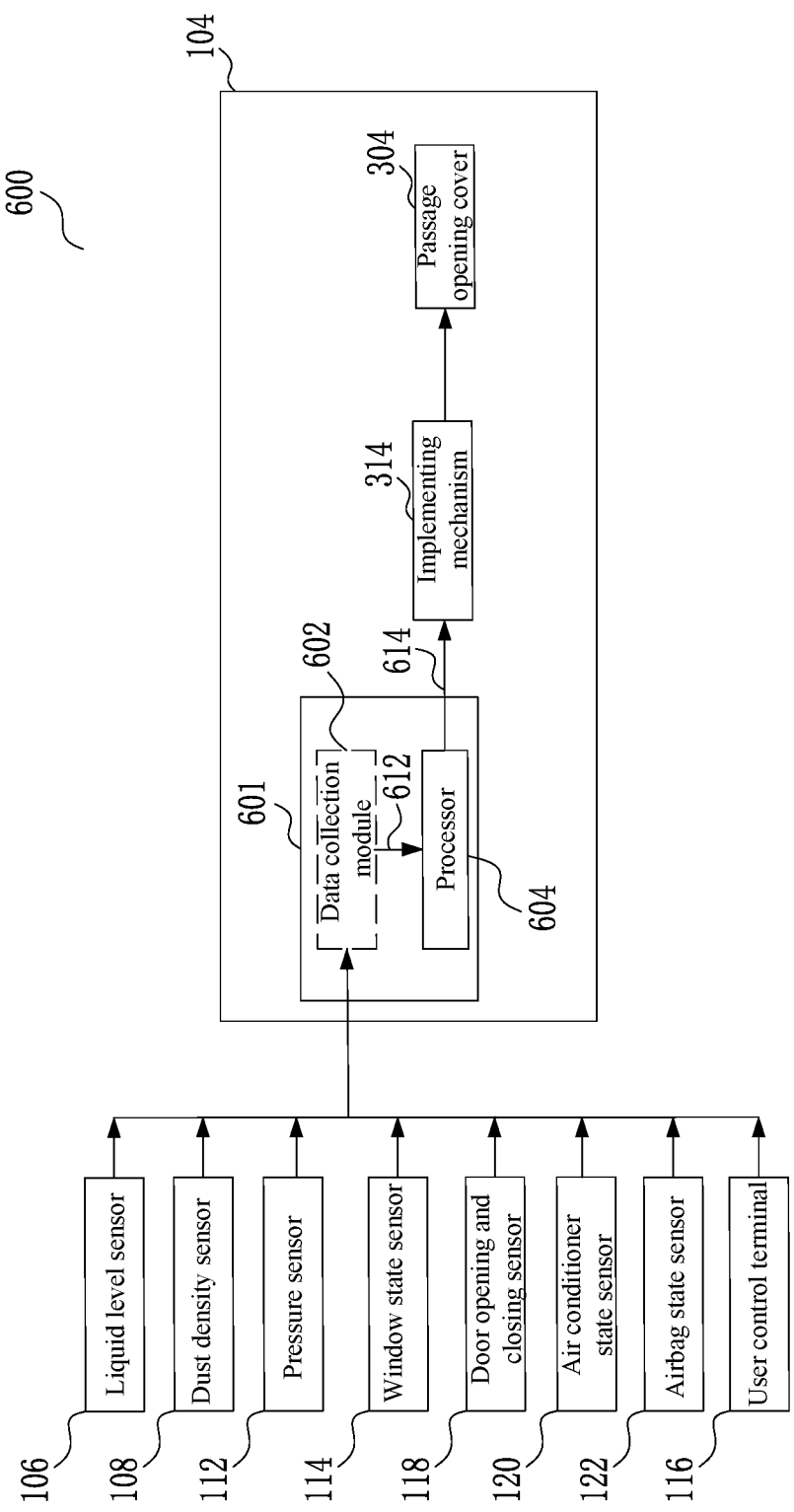
FIG. 6 is a schematic diagram of a control module 600 of the pressure relief valve 104 of the present disclosure.

FIG. 6 is a schematic diagram of a control module 600 of the pressure relief valve 104 of the present disclosure.

As shown in FIG. 6, the control module 600 includes the pressure relief valve 104 having a controller 601, and includes a user control terminal 116 configured to receive signals from a number of sensors. The sensors include a liquid level sensor 106, a dust density sensor 108, a pressure sensor 112, a window state sensor 114, a door opening and closing sensor 118, an air conditioner state sensor 120, and an airbag state sensor 122. Specifically, the controller 601 includes a data collection module 602 and a processor 604. The data collection module 602 receives signals collected by the above sensors or signals input by a user by means of the user control terminal 116, and transmits the received signals to the processor 604. According to control requirements, the processor 604 receives one or more of the collected signals from the data collection module 602, processes the signals, and then outputs the signals to the implementing mechanism 314. After receiving a control signal output from the processor 604, the driver 408 of the implementing mechanism 314 drives the movable rod 402 to move linearly, such that the passage opening cover 304 connected to the movable rod 402 is driven to move linearly to any position between the open position and the closed position. The controller 601 controls a linear movement distance of the movable rod 402 according to parameters received by the data collection module 602, and finally controls opening and closing, or the opening degree of the pressure relief valve 104.

In the embodiment shown in FIG. 6, the processor 604 is in a communication connection with the data collection module 602 via a first communication channel 612, and the processor 604 is in a communication connection with the implementing mechanism 314 via a second communication channel 614. A local interconnect network (LIN) connection or a controller area network (CAN) connection may be carried out in the first communication channel 612 and the second communication channel 614. In other embodiments, it is also possible to carry out other forms of communication connection in the first communication channel 612 and the second communication channel 614.

In the embodiment shown in FIG. 6, the controller 601 is arranged inside the pressure relief valve 104. For those of ordinary skills in the art, the controller 601 may also be arranged outside the pressure relief valve 104, for example, at a console of the vehicle or at other positions of the vehicle.

Figure 7:
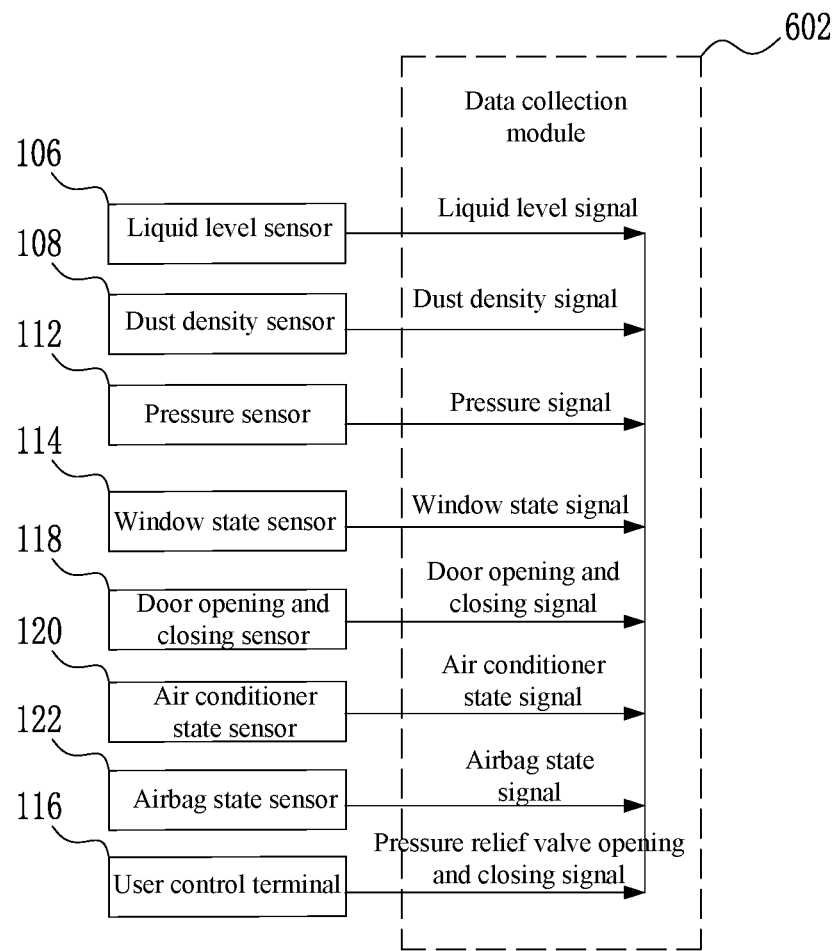
FIG. 7 is a detailed schematic diagram of a data collection module 602 shown in FIG. 6.

FIG. 7 is a detailed schematic diagram of the data collection module 602 shown in FIG. 6.

As shown in FIG. 7, the data collection module 602 can receive signals collected by a number of sensors or a control signal input by a user by means of the user control terminal 116. Specifically, the data collection module 602 collects a liquid level signal (a wading signal) of a vehicle from the liquid level sensor 106, collects a dust density signal of an environment where the vehicle is located from the dust density sensor 108, collects a pressure signal inside the vehicle cabin 102 from the pressure sensor 112, collects a window state signal from the window state sensor 114, collects a door opening and closing signal from the door opening and closing sensor 118, collects an air conditioner state signal from the air conditioner state sensor 120, and collects an airbag state signal from the airbag state sensor 122.

Figure 8:
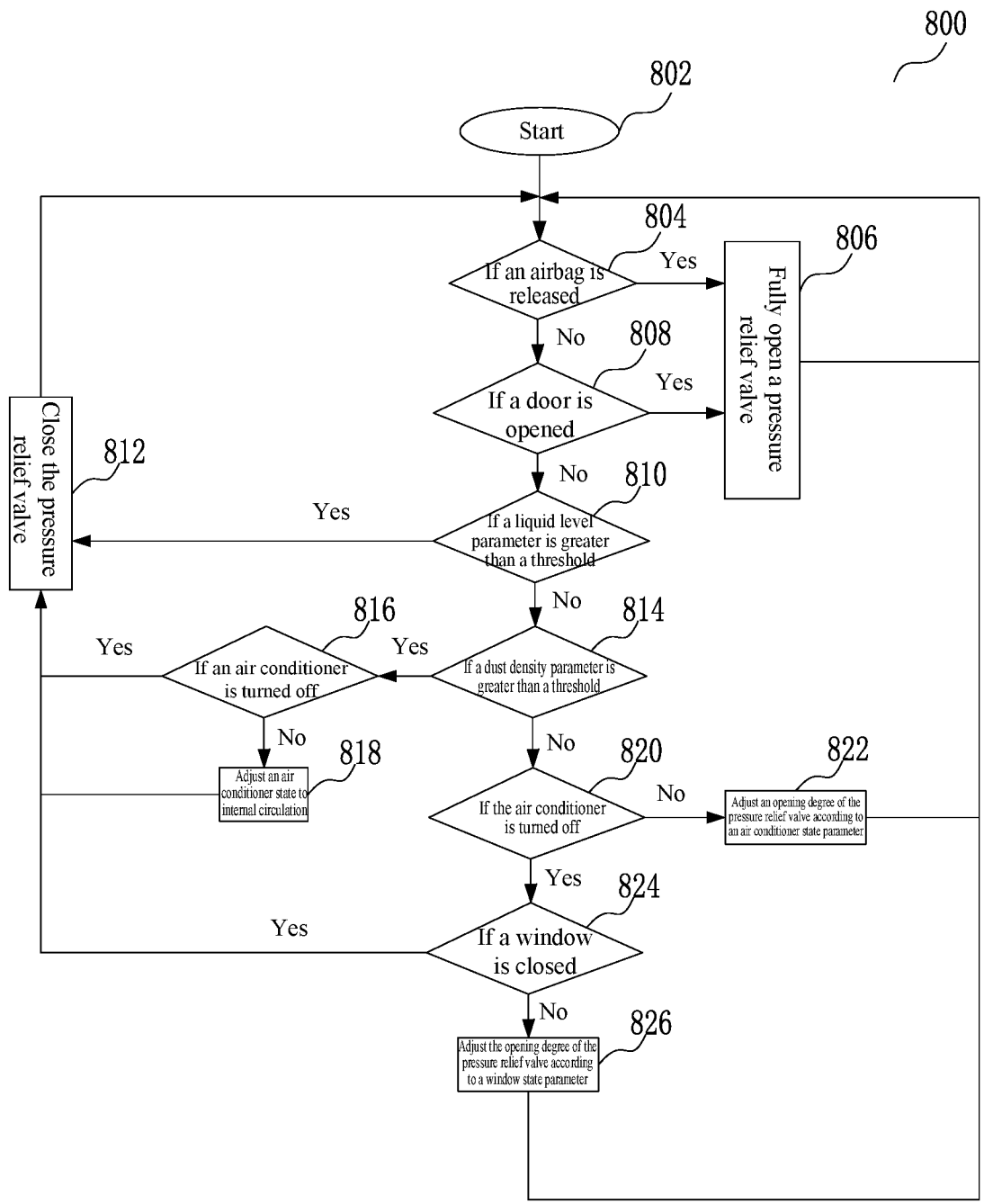
FIG. 8 is a flow block diagram 800 of a first embodiment of a control flow of the pressure relief valve 104 of the present disclosure.

FIG. 8 is a flow block diagram 800 of a first embodiment of a control flow of the pressure relief valve 104 of the present disclosure.

Before proceeding to step 804, the controller 601 collects and stores various parameters required for controlling the implementing mechanism 314 in advance. Specifically, the controller 601 collects a liquid level parameter of the vehicle from the liquid level sensor 106 arranged below a rear-view mirror, collects a dust density parameter of an environment where the vehicle is located from the dust density sensor 108, collects a window state parameter from the window state sensor 114, collects a door opening and closing parameter from the door opening and closing sensor 118, collects an air conditioner state parameter from the air conditioner state sensor 120, and collects an airbag state parameter from the airbag state sensor 122. In addition, a liquid level threshold and a dust density threshold are preset in the controller 601.

In one embodiment of the present disclosure, the liquid level threshold is set to be 15 cm, and the dust density threshold is set to be 150 ug/m3.

In another embodiment of the present disclosure, the liquid level sensor may also be replaced by an ultrasonic sensor.

After the controller 601 collects and sets the above parameters, an operation of step 804 is executed.

As shown in FIG. 8, in step 804, the processor 604 determines whether an airbag is released according to the collected airbag state parameter. If the airbag is released, proceed to step 806 in which the pressure relief valve 104 is fully opened. If the airbag is not released, proceed to step 808.

In step 808, the processor 604 determines whether a door is opened according to the collected door opening and closing parameter. If the door is opened, indicating that the door will be closed later and thus resulting in a pressure difference, proceed to step 806 in which the pressure relief valve 104 is fully opened. If the door is not opened, proceed to step 810.

In step 810, the processor 604 determines whether the vehicle is in a wading state according to the collected liquid level parameter. If the liquid level parameter is greater than the set liquid level threshold, indicating that the vehicle is in the wading state, proceed to step 812 in which the pressure relief valve 104 is closed in order to prevent water from entering the vehicle cabin 102. If the liquid level parameter is not greater than the set liquid level threshold, indicating that the vehicle is not in the wading state, proceed to step 814.

In step 814, the processor 604 determines whether the vehicle is in a high-dust-density environment according to the collected dust density parameter. If the dust density parameter is greater than the dust density threshold, indicating that the vehicle is in the high-dust-density environment, proceed to step 816, in order to prevent dust from entering the vehicle cabin 102. If the dust density parameter is not greater than the dust density threshold, indicating that the vehicle is not in the high-dust-density environment, proceed to step 820.

In step 816, the processor 604 determines whether an air conditioner is turned off according to the collected air conditioner state parameter. If the air conditioner is turned off, proceed to step 812 in which the pressure relief valve 104 is closed. If the air conditioner is not turned off, proceed to step 818 in which an air conditioner state is adjusted to internal circulation. After step 818, proceed to step 812 in which the pressure relief valve 104 is closed.

In step 820, the processor 604 determines whether the air conditioner is turned off according to the collected air conditioner state parameter. If the air conditioner is turned off, there is no need to consider the influence of the air conditioner on the air pressure inside the vehicle, and proceed to step 824. If the air conditioner is not turned off, proceed to step 822.

In step 822, the controller 601 adjusts an opening degree of the pressure relief valve 104 according to the collected air conditioner state parameter. In one embodiment of the present disclosure, when an intake air volume of the air conditioner is not greater than 50% of the maximum intake air volume, the pressure relief valve 104 is opened to 50% of the maximum opening degree. When the intake air volume of the air conditioner is greater than 50% of the maximum intake air volume, the pressure relief valve 104 is fully opened. When the air conditioner is adjusted to an internal circulation state (that is, there is no external air intake), the pressure relief valve 104 is opened to 25% of the maximum opening degree.

In step 824, the controller 601 determines whether a window is closed according to the collected window state parameter. If the window is closed, there is no need to consider the influence of an external air flow entering the vehicle through the opened window on the air pressure inside the vehicle, proceed to step 812 in which the pressure relief valve 104 is closed. If the window is not closed, proceed to step 826.

In step 826, the controller 601 adjusts the opening degree of the pressure relief valve 104 according to the collected window state parameter. In one embodiment of the present disclosure, in a window open state, the pressure relief valve 104 is opened to 50% of the maximum opening degree.

After the operations of step 806, step 812, step 822, and step 826 are executed, proceed to step 804 in which whether the airbag is released is redetermined.

For those of ordinary skills in the art, step 810 and step 814 may be exchanged in order, which has no influence on the control over the pressure relief valve 104 by the controller 601.

Figure 9:
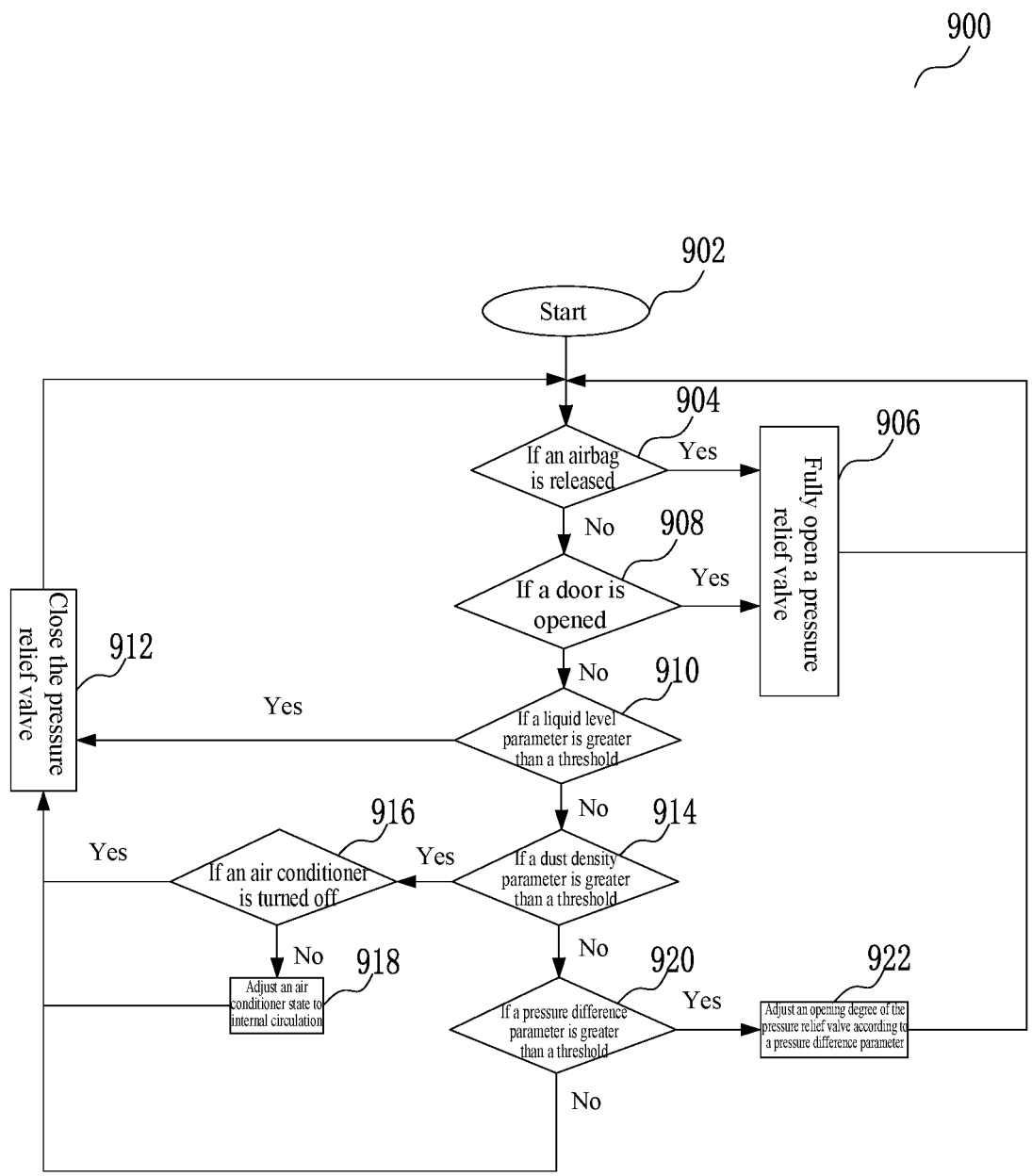
FIG. 9 is a flow block diagram 900 of a second embodiment of a control flow of the pressure relief valve 104 of the present disclosure.

FIG. 9 is a flow block diagram 900 of a second embodiment of a control flow of the pressure relief valve 104 of the present disclosure.

The control flow is similar to that shown in FIG. 8. Before proceeding to step 904, the controller 601 collects and stores various parameters required for controlling the implementing mechanism 314 in advance. Specifically, the controller 601 collects a liquid level parameter of the vehicle from the liquid level sensor 106, collects a dust density parameter of an environment where the vehicle is located from the dust density sensor 108, collects a pressure parameter inside the vehicle cabin 102 from the pressure sensor 112, collects a door opening and closing parameter from the door opening and closing sensor 118, and collects an airbag state parameter from the airbag state sensor 122. In addition, a liquid level threshold, a dust density threshold, a standard atmospheric pressure parameter, and a pressure difference threshold are preset in the controller 601.

In one embodiment of the present disclosure, the liquid level threshold is set to be 15 cm, the dust density threshold is set to be 150 ug/m3, the standard atmospheric pressure parameter is set to be 101.325 kPa, and the pressure difference threshold is set to be 5 Pa.

As shown in FIG. 9, in step 904, the processor 604 determines whether an airbag is released according to the collected airbag state parameter. If the airbag is released, proceed to step 906 in which the pressure relief valve 104 is fully opened. If the airbag is not released, proceed to step 908.

In step 908, the processor 604 determines whether a door is opened according to the collected door opening and closing parameter. If the door is opened, indicating that the door will be closed later and thus resulting in a pressure difference, proceed to step 906 in which the pressure relief valve 104 is fully opened. If the door is not opened, proceed to step 910.

In step 910, the processor 604 determines whether the vehicle is in a wading state according to the collected liquid level parameter. If the liquid level parameter is greater than the set liquid level threshold, indicating that the vehicle is in the wading state, proceed to step 912 in which the pressure relief valve 104 is closed, in order to prevent water from entering the vehicle cabin 102. If the liquid level parameter is not greater than the set liquid level threshold, indicating that the vehicle is not in the wading state, proceed to step 914.

In step 914, the processor 604 determines whether the vehicle is in a high-dust-density environment according to the collected dust density parameter. If the dust density parameter is greater than the dust density threshold, indicating that the vehicle is in the high-dust-density environment, proceed to step 916, in order to prevent dust from entering the vehicle cabin 102. If the dust density parameter is not greater than the dust density threshold, indicating that the vehicle is not in the high-dust-density environment, proceed to step 920.

In step 916, the processor 604 determines whether an air conditioner is turned off according to the collected air conditioner state parameter. If the air conditioner is turned off, proceed to step 912 in which the pressure relief valve 104 is closed. If the air conditioner is not turned off, proceed to step 918 in which an air conditioner state is adjusted to internal circulation. After step 918, proceed to step 912 in which the pressure relief valve 104 is closed.

In step 920, the processor 604 calculates a pressure difference between the pressure inside the vehicle cabin 102 and the standard atmospheric pressure outside the vehicle cabin 102 according to the collected pressure parameter. If the calculated pressure difference parameter is not greater than the set pressure difference threshold, indicating that the pressure inside the vehicle cabin 102 is normal, proceed to step 912 in which the pressure relief valve 104 is closed. If the calculated pressure difference parameter is greater than the set pressure difference threshold, indicating that the pressure inside the vehicle cabin 102 is too high, proceed to step 922.

In step 922, the controller 601 adjusts the opening degree of the pressure relief valve 104 according to the collected pressure parameter. In one embodiment of the present disclosure, when the calculated pressure difference parameter is greater than 5 Pa and not greater than 50 Pa, the pressure relief valve 104 is opened to 50% of the maximum opening degree. When the calculated pressure difference parameter is greater than 50 Pa, the pressure relief valve 104 is fully opened.

After the operations of step 906, step 912, and step 922 are executed, proceed to step 904 in which whether the airbag is released is redetermined.

For those of ordinary skills in the art, step 910 and step 914 may be exchanged in order, which has no influence on the control over the pressure relief valve 104 by the controller 601.

Figure 10:
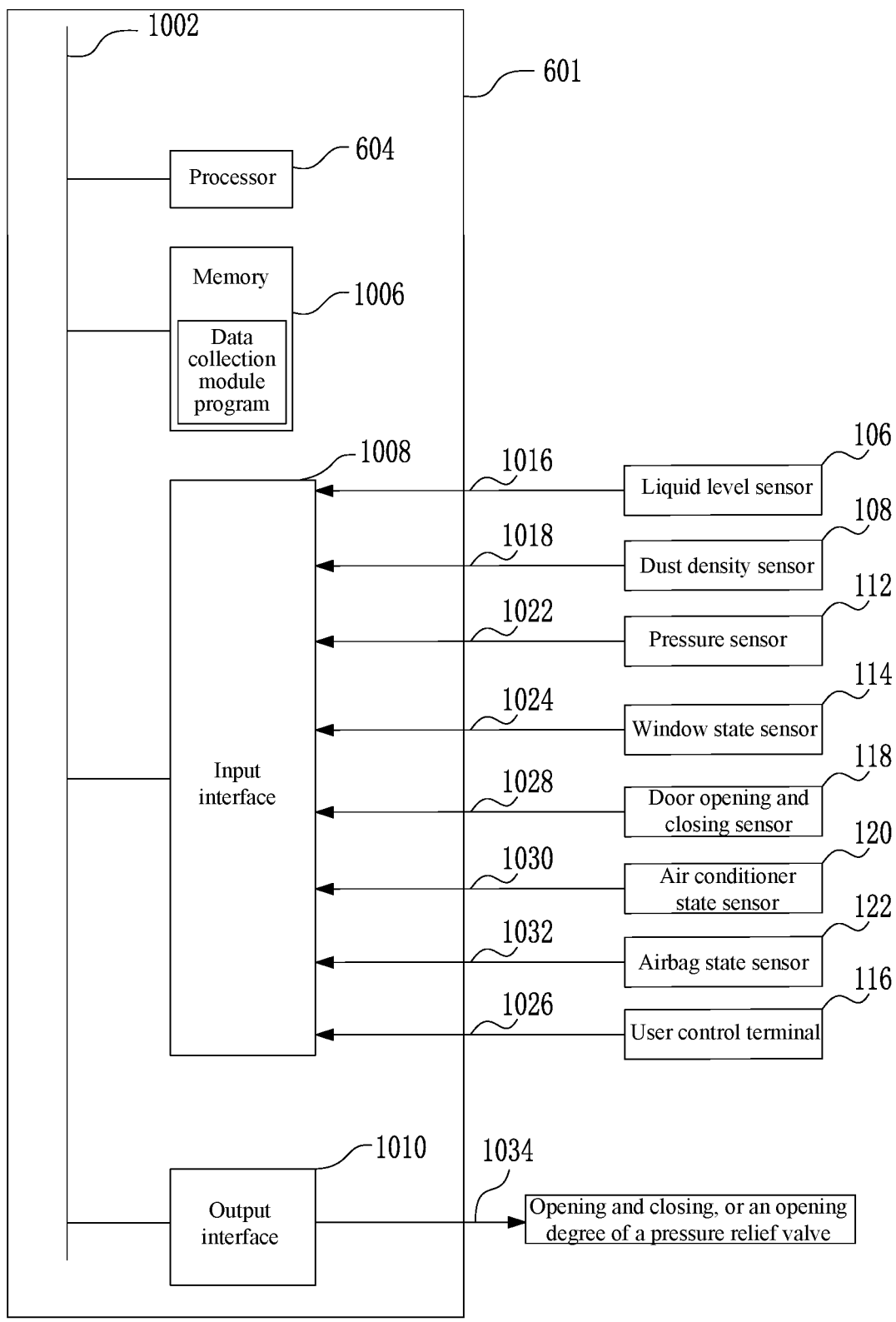
FIG. 10 is a detailed block diagram of a controller 601 shown in FIG. 6.

FIG. 10 is a detailed block diagram of the controller 601 shown in FIG. 6, and shows main components of the controller 601. The controller 601 can store and execute programs in the flows shown in FIGS. 8 and 9, and store and call the parameters required by the flows shown in FIGS. 8 and 9.

As shown in FIG. 10, the controller 601 includes a bus 1002, a processor 604, a memory 1006, an input interface 1008, and an output interface 1010. The processor 604, the memory 1006, the input interface 1008, and the output interface 1010 are connected to the bus 1002. The processor 604 may read program(s) (or instructions) from the memory 1006 and execute the program(s) (or instructions) to process data so as to control the operation of the pressure relief valve 104. The processor 604 may further write data or program(s) (or instructions) into the memory 1006. The memory 1006 may store program(s) (or instructions) or data of the data collection module. By executing the instructions in the memory 1006, the processor 1004 can control the memory 1006, the input interface 1008, and the output interface 1010. In the present disclosure, the memory 1006 can store the programs for executing the flows shown in FIGS. 8 and 9 and the operation parameters required for executing the programs.

The input interface 1008 is configured to receive input parameters from the liquid level sensor 106, the dust density sensor 108, the pressure sensor 112, the window state sensor 114, the door opening and closing sensor 118, an air conditioner state sensor 120, the airbag state sensor 122, and the user control terminal 116 by means of connecting lines 1016, 1018, 1022, 1024, 1028, 1030, 1032, and 1026, respectively, convert data of the parameters into signals recognizable by the processor 604, and store the signals in the memory 1006.

The processor 604 is configured to compute relevant parameters for controlling the opening and closing, or the opening degree of the pressure relief valve 104 according to the programs stored in the memory 1006.

The output interface 1010 is configured to receive parameters relevant to the opening and closing, or the opening degree of the pressure relief valve 104 from the processor 604, and a control signal for the pressure relief valve 104 is outputted from the output interface 1010 by means of a connecting line 1034.

Compared with the pressure relief valve in the prior art, the electric pressure relief valve of the present disclosure has the following advantages.

First, according to the present disclosure, an existing flexible rubber sheet structure is changed, the opening is provided on the side face of the housing, and the driving mechanism drives the cover to move close to or away from the opening in a first position, in a second position, and to any position between the first position and the second position, so as to open, close or partially open the air passage, such that the pressure inside the vehicle cabin is released, and the problems of poor tightness of the existing flexible rubber sheet, vibration noise and flapping noise of the flexible rubber sheet and the like are prevented.

Second, compared with an existing pressure relief valve having a flexible rubber sheet structure for passive exhaust, the pressure relief valve of the present disclosure improves the waterproof, dustproof and external noise prevention performance of the vehicle, optimizes the wading performance of the vehicle to adapt to various harsh vehicle conditions, and improves the noise, vibration and harshness (NVH) quality of the vehicle.

Third, according to the present disclosure, the signals (parameters) of the vehicle body are received by the implementing mechanism or the controller, and the motor is employed to drive the cover to move, such that the pressure relief valve is more intelligent, electrification and controllability of the pressure relief valve are achieved, which conforms to the development trend of electric vehicles.

Although the present disclosure is described in conjunction with the examples of embodiments outlined above, various alternatives, modifications, variations, improvements, and/or substantial equivalents that are known or current or to be anticipated before long may be obvious to those of at least ordinary skill in the art. In addition, the technical effects and/or technical problems described in the present disclosure are illustrative rather than restrictive. Therefore, the disclosed description in the present disclosure may be used to solve other technical problems and have other technical effects and/or may solve other technical problems. Accordingly, the examples of the embodiments of the present disclosure as set forth above are intended to be illustrative rather than limiting. Various changes can be made without departing from the spirit or scope of the present disclosure. Therefore, the present disclosure is intended to include all known or earlier developed alternatives, modifications, variations, improvements and/or basic equivalents.

What is claimed is:

1. A pressure relief valve configured to adjust a pressure of a vehicle cabin, the pressure relief valve comprising:
    a housing being provided with a passage therein, the passage being configured to be capable of bringing the vehicle cabin into fluid communication with an outside atmosphere, and the passage having a passage opening;
    a passage opening cover being configured to be movable between an open position and a closed position, the passage opening being open when the passage opening cover is in the open position, and the passage opening being closed when the passage opening cover is in the closed position;
    an implementing mechanism being configured to drive the passage opening cover such that the passage opening cover moves between the open position and the closed position; and
    a sealing component arranged on the passage opening cover, wherein the sealing component is configured such that the sealing component sealingly covers the passage opening when the passage opening cover is in the closed position, wherein the sealing component is located between a surface around the passage opening and the passage opening cover when the passage opening cover is in the closed position.

2. The pressure relief valve according to claim 1, wherein the implementing mechanism comprises a driver and a movable rod.

3. The pressure relief valve according to claim 2, wherein the pressure relief valve further comprises a controller configured to control the movement of the implementing mechanism.

4. The pressure relief valve according to claim 1, wherein the implementing mechanism comprises a motor for driving the passage opening cover to move between the open position and the closed position.

5. The pressure relief valve according to claim 3, wherein the pressure relief valve further comprises a data collection module configured to collect parameters of a vehicle body, the controller configured to control the movement of the movable rod according to the parameters of the vehicle body, so as to control the movement of the passage opening cover between the open position and the closed position.

6. The pressure relief valve according to claim 5, wherein the data collection module further comprises a liquid level sensor configured to be located in an interior of a vehicle for collecting a liquid level parameter, the controller configured to control the movement of the movable rod according to the liquid level parameter, so as to control the movement of the passage opening cover between the open position and the closed position.

7. The pressure relief valve according to claim 5, wherein the data collection module further comprises a dust density sensor for collecting a dust density parameter corresponding to dust exterior to a vehicle, the controller configured to control the movement of the movable rod according to the dust density parameter, so as to control the movement of the passage opening cover between the open position and the closed position.

8. The pressure relief valve according to claim 5, wherein the data collection module further comprises an airbag state sensor for collecting an airbag state parameter, the controller configured to control the movement of the movable rod according to the airbag state parameter, so as to control the movement of the passage opening cover between the open position and the closed position.

9. The pressure relief valve according to claim 6, wherein the data collection module further comprises a door opening and closing sensor for collecting a door opening and closing parameter, the controller configured to control the movement of the movable rod according to the door opening and closing parameter, so as to control the movement of the passage opening cover between the open position and the closed position.

10. The pressure relief valve according to claim 5, wherein the controller is configured to control a movement distance of the movable rod according to the parameters of the vehicle body, so as to control an opening and closing or an opening degree of the pressure relief valve.

11. The pressure relief valve according to claim 10, wherein the data collection module further comprises an air conditioner state sensor for collecting an air conditioner state parameter, the controller configured to control the movement of the movable rod according to the air conditioner state parameter, so as to control the movement of the passage opening cover between the open position and the closed position, or to control the opening degree of the passage opening cover.

12. The pressure relief valve according to claim 10, wherein the data collection module further comprises a window state sensor for collecting a window state parameter, the controller configured to control the movement of the movable rod according to the window state parameter, so as to control the movement of the passage opening cover between the open position and the closed position, or to control the opening degree of the passage opening cover.

13. The pressure relief valve according to claim 10, wherein the data collection module further comprises a pressure sensor for collecting a pressure parameter, the controller configured to control the movement of the movable rod according to the pressure parameter, so as to control the movement of the passage opening cover between the open position and the closed position, or to control the opening degree of the passage opening cover.

14. The pressure relief valve according to claim 10, wherein the data collection module further comprises a user control terminal for collecting a user input parameter, the controller configured to control the movement of the movable rod according to the user input parameter, so as to control the movement of the passage opening cover between the open position and the closed position, or to control the opening degree of the passage opening cover.

15. The pressure relief valve according to claim 5, wherein the controller comprises a processor,
    the processor is in a communication connection with the data collection module via a first communication channel, and
    the processor is in a communication connection with the implementing mechanism via a second communication channel, wherein a LIN connection or a CAN connection is capable of being carried out in the first communication channel, and a LIN connection or a CAN connection is capable of being carried out in the second communication channel.

16. The pressure relief valve according to claim 1, wherein the pressure relief valve further comprises a housing sealing strip being configured to sealingly fix the housing to a metal plate of a vehicle.

17. The pressure relief valve according to claim 1, wherein the passage opening cover is moved in a straight line to any position between the open position and the closed position.

18. A vehicle having the pressure relief valve according to claim 1.

19. A method for controlling a pressure relief valve for a vehicle, the pressure relief valve comprising a housing, a passage opening cover, and an implementing mechanism, wherein the housing is provided with a passage therein, and the passage has a passage opening, characterized by the method comprising:

setting thresholds of a vehicle operation environment;

collecting parameters of the vehicle operation environment;

comparing and analyzing the parameters of the vehicle operation environment to the thresholds of the vehicle operation environment; and controlling the implementing mechanism according to a comparison result, so as to control an opening and closing or an opening degree of the passage opening cover, wherein the thresholds of the vehicle operation environment include one or more of a liquid level threshold, a dust density threshold, and a pressure differential threshold, and wherein the parameters of the vehicle operation environment include one or more of a liquid level parameter from an interior of the vehicle, a dust density parameter corresponding to dust exterior to the vehicle, and a pressure differential between the cabin and the exterior of the vehicle parameter.

* * * * *